United States Patent [19]

Plies

[11] Patent Number: 5,247,392
[45] Date of Patent: Sep. 21, 1993

[54] OBJECTIVE LENS FOR PRODUCING A RADIATION FOCUS IN THE INSIDE OF A SPECIMEN

[75] Inventor: Erich Plies, Munich, Fed. Rep. of Germany

[73] Assignee: Siemens Aktiengesellschaft, Munich, Fed. Rep. of Germany

[21] Appl. No.: 837,884

[22] Filed: Feb. 20, 1992

[30] Foreign Application Priority Data

May 21, 1991 [DE] Fed. Rep. of Germany ....... 4116545

[51] Int. Cl.$^5$ .......................... G02B 21/02; G02B 3/00
[52] U.S. Cl. .................................... 359/661; 359/660; 359/664
[58] Field of Search .......................... 359/660, 661, 664

[56] References Cited

U.S. PATENT DOCUMENTS 4,577,566 12/1985 Kikuchi et al. .................. 359/664 X
5,004,328 4/1991 Suzuki et al. ...................... 359/664

FOREIGN PATENT DOCUMENTS 0384377 8/1990 European Pat. Off. .
2954333 11/1983 Fed. Rep. of Germany .

OTHER PUBLICATIONS

"Picosecond Noninvasive Optical Detection of Internal Electrical Signals in Flip-Chip-Mounted Silicon Integrated Circuits", by H. K. Heinrich, IBM Journal of Research & Development, vol. 34, No. 2/3, Mar./May 1990, pp. 162–172.
"Spherical Lenses for Infrared and Microwaves", by G. Toraldo Di Francia, J. Appl. Phys. 32, May 19, 1961, p. 2051.
"Microwave Scanning Antennas", Edited by R. C. Hansen, Academic Press, New York, (1964), pp. 214–218.

Primary Examiner—Scott J. Sugarman
Attorney, Agent, or Firm—Hill, Steadman & Simpson

[57] ABSTRACT

Objective lens for producing a radiation focus in the inside of a specimen. Many laser measuring methods for sensing charge carrier density or the distribution of a potential in the inside of an integrated circuit (IC) of microelectronics are based on what is referred to as "backside-probing" technique, whereby the laser radiation (LA) is focused into the plane of the voltage-carrying components (SK) from the backside of the component using a conventional microscope objective. Since the irradiation occurs through the substrate (SU), a pronounced spherical aberration arises that limits the spatial resolution to approximately 2 through 4 μm. For producing a sub-μ probe in the substrate (SU), a lens is arranged on the polished backside (RS) of the integrated circuit (IC), this lens being composed of a silicon base plate (GP, refractive index of $n_1$), a sphere (KU, refractive index of $n_2 < n_1$, radius of $r_2$) lying in a recess of the base plate (GP), and a hemispherical silicon shell (KS, refractive index of $n_1$, outside radius of $r_1$, inside radius of $r_2$). Given a suitable selection of the refractive indices and of the radii, the lens and the substrate (SU) form an optical unit acting as a 2-index Luneburg lens that focuses an incident, parallel ray beam (LA) at a point (LF) lying in the inside of the substrate (SU).

18 Claims, 1 Drawing Sheet

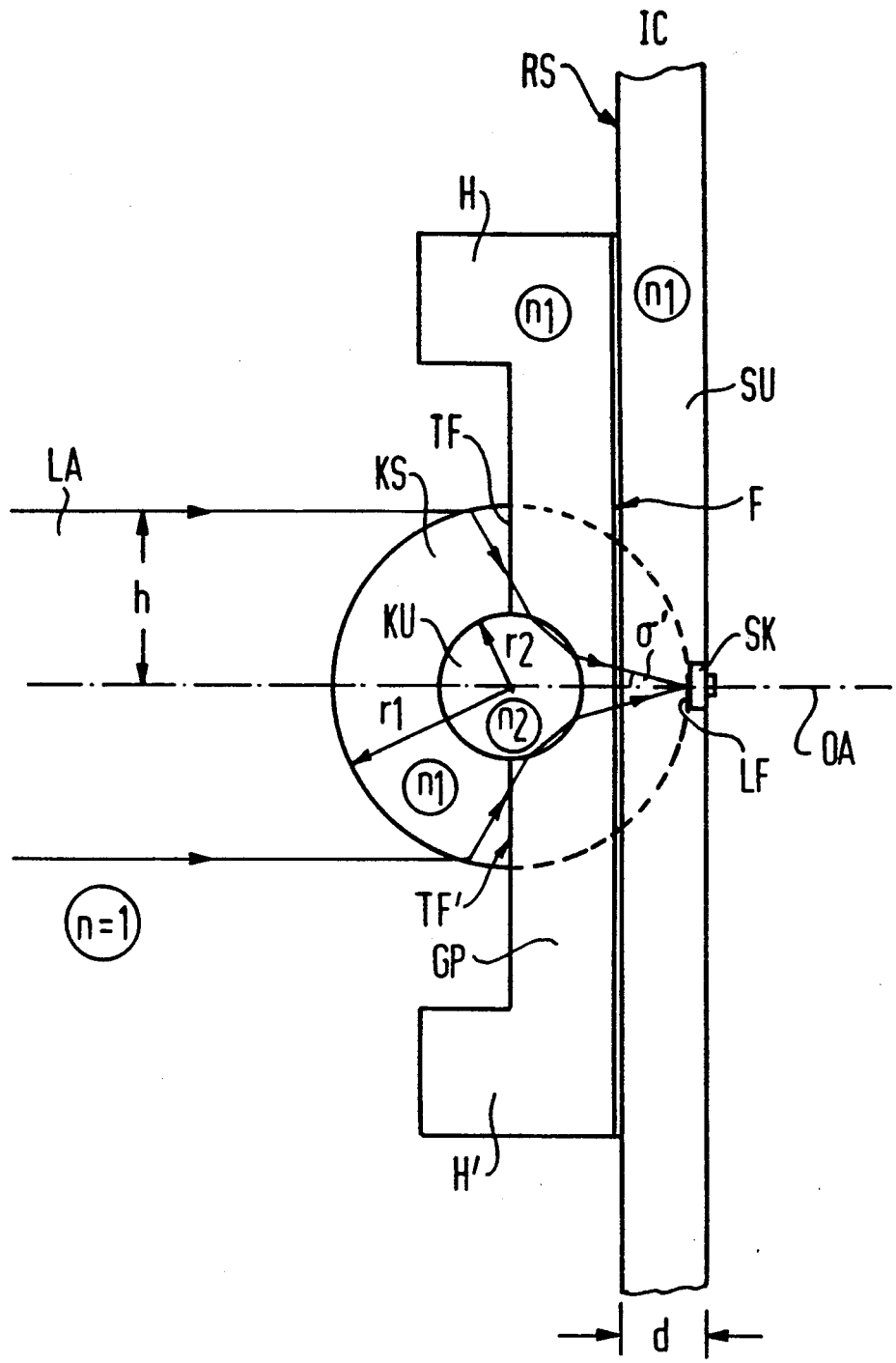

OBJECTIVE LENS FOR PRODUCING A RADIATION FOCUS IN THE INSIDE OF A SPECIMEN

BACKGROUND OF THE INVENTION

An article, "Picosecond Noninvasive Optical Detection Of Internal Electrical Signals In Flip-Chip-Mounted Silicon Integrated Circuits", IBM J. Res. Develop., Vol. 34, No. 2/3 (1990), pages 162–172 discloses a laser measuring method for sensing the charge carrier density in the inside of a component of microelectronics. It is based on what is referred to as a "backside-probing" technique, wherein the laser radiation is focused into the plane of the voltage-carrying components from the backside of the component using a conventional microscope objective. Since the irradiation occurs through the substrate that is approximately 0.4 mm thick, a pronounced spherical aberration arises that limits the spatial resolution to 2 through 4 $\mu$m. It has therefore been proposed to diminish the spherical aberration by grinding the substrate to such an extent that a spatial resolution lying in the sub-micrometer range is achieved with a conventional microscope objective at a wavelength of $\lambda = 1.3$ $\mu$m. Grinding down the substrate to fractions of a millimeter, however, jeopardizes the mechanical stability of the component. Moreover, it is not assured that this type of preparation has no influence on the electrical functioning of the component.

What is referred to as a Luneburg lens belongs to the class of absolute optical instruments having perfect geometrical-optical imaging. It is composed of a nonhomogeneous sphere having a radius R whose refractive index n is a function of the distance r from the center of the sphere. When the refractive index n obeys the relationship $n(r) = (2 - r^2/R^2)^{\frac{1}{2}}$, then every parallel beam incident from an arbitrary spatial direction is united in an ideal focus on the sphere surface. The Luneburg lens serves as antenna in microwave technology, whereby this antenna is then composed of a plurality of dielectric spherical shells having different but respectively constant refractive indices.

A Luneburg lens composed only of an inner sphere and of an outer sphere is disclosed in the references of J. Appl. Phys. 32 (1961) page 2051 and R. C. Hansen, Editor, "Microwave Scanning Antennas", Academic Press, New York (1965) pages 214–218. This lens has an extremely low spherical aberration with slight zonal aberration, so that it is employable up to an incident height of $h = 0.95$ $r_1$ (where $r_1$ is the radius of the outer sphere).

SUMMARY OF THE INVENTION

It is an object of the present invention to provide an objective lens having a low spherical aberration for producing a radiation focus in the inside of a specimen. This object is achieved by an objective lens having: a plate arranged on a planar surface of the specimen, whereby the plate is composed of a first material having a first refractive index and is provided with a hemispherical recess having a radius $r_2$; a sphere arranged in the recess and having a radius $r_2$, whereby the sphere is composed of a second material having a second refractive index and wherein the second refractive index is lower than the first refractive index; and a hemispherical shell composed of the first material, the hemispherical shell having an outer radius $r_1$ and an inner radius $r_2$ and being arranged on the plate and on the sphere.

The advantage obtainable with the present invention is that the charge carrier density and the distribution of potential in a component of microelectronics can be sensed with a spatial resolution lying in the sub-micrometer range.

The following are advantageous improvements of the present invention. The radii $r_1$ and $r_2$ satisfy the condition $r_1 - r_2 > d$, whereby d is the thickness of the specimen measured in the direction of a parallel beam incident on the hemispherical shell. The specimen, the plate and the hemispherical shell can be composed of the same material. The hemispherical shell can be glued to the plate. Furthermore, the plate can be displaceably arranged on the specimen and an oil film can be provided between the plate and the planar surface. The plate, the hemispherical shell and the specimen can be composed of silicon. In this embodiment, the second material can have a refractive index of approximately $n_2 = 2.7$ and the sphere can be composed of arsenic triselenide glass, telluride glass, CdTe or $As_{35}S_{10}Se_{35}Te_{20}$. Also, the plate can be provided with mount elements.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

The single FIGURE depicts an exemplary embodiment of an objective lens of the present invention.

DESCRIPTION OF THE PREFERRED EMBODIMENT

The objective lens schematically shown in FIG. 1 has the function of imaging a parallel beam LA incident along an optical axis OA into the plane of a voltage-carrying components SK of an integrated circuit IC of microelectronics. It is arranged at a backside RS of a silicon substrate SU (refractive index of $n_1 = 3.5$) that is polished optically flat, whereby an oil film F present between the lens and the substrate SU guarantees a low-friction displacement of the integrated circuit IC in a plane oriented perpendicular to the optical axis OA. The oil film F also contributes to improving the imaging quality since this effects less of a beam offset than an air gap between the lens and the substrate SU. The objective lens is composed of a silicon base plate GP (refractive index of $n_1 = 3.5$) equipped with mount elements H, H', a sphere KU (refractive index of $n_2 < n_1$) arranged in a hemispherical recess of the base plate GP and having a radius $r_2$, and a hemispherical silicon shell KS (refractive index of $n_1$, outer radius of $r_1$, inner radius of $r_2$) that is arranged on the sphere KU and that is glued to the base plate GP at the parting surfaces TF, TF'. Given a suitable selection of the refractive index $n_2$ and of the radii $r_1$ and $r_2$, the hemispherical shell KS, the sphere KU, the base plate GP and the silicon substrate SU form an optical unit acting as a 2-index Luneburg lens that focuses the incident parallel beam LA at a point LF lying on a continuation of the spherical shell shown with broken lines. A lens spherically corrected up to the incidence height $h < 0.95$ $r_1$ is particularly obtained when the sphere material has a refractive index of $n_2 = 2.71$ and when the ratio of the radii $r_2/r_1$ is 0.39.

The integrated circuit can remain unaltered with respect to the thickness d of the substrate SU insofar as the thickness d satisfies the condition:

$$d < r_1 - r_2 \qquad (1).$$

This can be easily met for standard substrate thicknesses of $d > 0.4$ mm. A polishing of, the backside RS of the integrated circuit IC is merely required in order to guarantee a uniform contact between the objective lens and the substrate SU.

The spatial resolution $\delta$ obtained with the objective lens is calculated as:

$$\delta = 0.61 \, \lambda/NA \qquad (2)$$

with $$NA = n_1 \cdot \sin \sigma' \qquad (3).$$

where $\lambda$ is the vacuum wavelength of the incident radiation LA and $\sigma'$ is half the aperture angle of the beam in the substrate SU. Since the objective lens has a numerical aperture of $NA = n_1 \cdot \sin \sigma' = 0.96$, equation (1) is simplified to read $\delta = 0.64 \, \lambda$, so that a spatial resolution of $\delta = 0.83 \, \mu m$ is obtained for $\lambda = 1.3 \, \mu m$ (infrared radiation).

The absolute values of $r_1$ and $r_2$ do not enter into the spatial resolution. Nonetheless, a limitation of the sphere radii to values of $r_1 < 4$ mm and $r_2 < 1.56$ mm is required in order to keep the residual zonal aberration of the lens adequately low. Optical quality spheres having a radius of $r_2 < 1.56$ mm can be manufactured by machine. For example, they are utilized as hemispherical front lenses in apochromatic microscope objectives. Arsenic triselenide glass, telluride glass, CdTe or $As_{35}S_{10}Se_{35}Te_{20}$ particularly come into consideration as sphere material, since their refractive indices for infrared radiation having the wavelength $\lambda = 1.3 \, \mu m$ lie in the region of $n_2 \approx 2.7$.

The techniques known from micromechanics are particularly employed in the manufacture of the lens parts composed of silicon (hemispherical shell KS, base plate GP with hemispherical recess). The lens parts should be fabricated tension-free in order to avoid causing disturbing birefringence effects.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An objective lens for focusing radiation in the inside of a specimen, comprising:
    a specimen;
    a plate arranged on a planar surface of the specimen, the plate being composed of a first material having a first refractive index and provided with a hemispherical recess having a radius $r_2$;
    a sphere arranged in said recess and having a radius $r_2$, said sphere being composed of a second material having a second refractive index, said second refractive index being lower than said first refractive index and being substantially constant over said radius $r_2$; and
    a hemispherical shell composed of said first material, said hemispherical shell having an outer radius $r_1$ and an inner radius $r_2$ and being arranged on said plate and said sphere.

2. The objective lens according to claim 1, wherein the radii $r_1$ and $r_2$ satisfy the condition $r_1 - r_2 > d$, where d is the thickness of the specimen measured in the direction of a parallel ray beam incident on the hemispherical shell.

3. The objective lens according to claim 1, wherein the specimen, the plate and the hemispherical shell are composed of the same material.

4. The objective lens according to claim 1, wherein the hemispherical shell is attached to the plate with a glue.

5. The objective lens according to claim 1, wherein the plate is displaceably arranged on the specimen.

6. The objective lens according to claim 5, wherein the objective lens further comprises an oil film between the plate and said planar surface.

7. The objective lens according to claim 1, wherein the plate, the hemispherical shell and the specimen are composed of silicon.

8. The objective lens according to claim 1, wherein said plate has mount elements.

9. An objective lens for focusing radiation in the inside of a specimen, comprising:
    a specimen;
    a plate arranged on a planar surface of the specimen, the plate being composed of a first material having a first refractive index and provided with a hemispherical recess having a radius $r_2$;
    a sphere arranged in said recess and having a radius $r_2$, said sphere being composed of a second material having a second refractive index and said second refractive index being lower than said first refractive index; and
    a hemispherical shell composed of said first material, said hemispherical shell having an outer radius $r_1$ and an inner radius $r_2$ and being arranged on said plate and said sphere, the plate, the hemispherical shell and the specimen being composed of silicon, and said second material having a refractive index of approximately 2.7.

10. An objective lens for focusing radiation in the inside of a specimen, comprising:
    a specimen;
    a plate arranged on a planar surface of the specimen, the plate being composed of a first material having a first refractive index and provided with a hemispherical recess having a radius $r_2$;
    a sphere arranged in said recess and having a radius $r_2$, said sphere being composed of a second material having a second refractive index and said second refractive index being lower than said first refractive index; and
    a hemispherical shell composed of said first material, said hemispherical shell having an outer radius $r_1$ and an inner radius $r_2$ and being arranged on said plate and said sphere, the plate, the hemispherical shell and the specimen being composed of silicon, and said sphere being composed of one of arsenic triselenide glass, telluride glass, CdTe and $As_{35}S_{10}Se_{35}Te_{20}$.

11. An objective lens for focusing radiation in the inside of a specimen, comprising:

a specimen;

a plate displaceably arranged on a planar surface of the specimen with an oil film between the plate and the planar surface, the plate being composed of a first material having a first refractive index and provided with a hemispherical recess having a radius $r_2$;

a sphere arranged in said recess and having a radius $r_2$, said sphere being composed of a second material having a second refractive index, said second refractive index being lower than said first refractive index and being substantially constant over said radius $r_2$; and a hemispherical shell composed of said first material, said hemispherical shell having an outer radius $r_1$ and an inner radius $r_2$ and being arranged on said plate and said sphere, the radii $r_1$ and $r_2$ satisfying the condition $r_1 - r_2 > d$, where d is the thickness of the specimen measured in the direction of a parallel ray beam incident on the hemispherical shell.

12. The objective lens according to claim 11, wherein the specimen, the plate and the hemispherical shell are composed of the same material.

13. The objective lens according to claim 11, wherein the plate, the hemispherical shell and the specimen are composed of silicon.

14. An objective lens for focusing radiation in the inside of a specimen, comprising:

a specimen;

a plate arranged on a planar surface of the specimen, the plate being composed of a first material having a first refractive index and provided with a hemispherical recess having a radius $r_2$;

a sphere arranged in said recess and having a radius $r_2$, said sphere being composed of a second material having a second refractive index of approximately 2.7 and said second refractive index being lower than said first refractive index; and a hemispherical shell composed of said first material, said hemispherical shell having an outer radius $r_1$ and inner radius $r_2$ and being arranged on said plate and said sphere, the radii $r_1$ and $r_2$ satisfying the condition $r_1 - r_2 > d$, where d is the thickness of the specimen measured in the direction of a parallel ray beam incident on the hemispherical shell.

15. An objective lens for focusing radiation in the inside of a specimen, comprising:

a specimen;

a plate arranged on a planar surface of the specimen, the plate being composed of a first material having a first refractive index and provided with a hemispherical recess having a radius $r_2$;

a sphere arranged in said recess and having a radius $r_2$, said sphere being composed of a second material having a second refractive index and said second material being one of arsenic triselenide glass, telluride glass, CdTe and $As_{35}S_{10}Se_{35}Te_{20}$ and said second refractive index being lower than said first refractive index; and a hemispherical shell composed of said first material, said hemispherical shell having an outer radius $r_1$ and inner radius $r_2$ and being arranged on said plate and said sphere, the radii $r_1$ and $r_2$ satisfying the condition $r_1 - r_2 > d$, where d is the thickness of the specimen measured in the direction of a parallel ray beam incident on the hemispherical shell.

16. An objective lens for focusing radiation in the inside of a specimen that is composed of silicon comprising:

a specimen;

a plate displaceably arranged on a planar surface of the specimen with an oil film between the plate and the planar surface, the plate being composed of silicon having a first refractive index and provided with a hemispherical recess having a radius $r_2$;

a sphere arranged in said recess and having a radius $r_2$, said sphere being composed of a material having a second refractive index of approximately 2.7, said second refractive index being lower than said first refractive index and being substantially constant over said radius $r_2$; and a hemispherical shell composed of silicon, said hemispherical shell having an outer radius $r_1$ and an inner radius $r_2$ and being arranged on said plate and said sphere.

17. The objective lens according to claim 16, wherein the radii $r_1$ and $r_2$ satisfy the condition $r_1 - r_2 > d$, where d is the thickness of the specimen measured in the direction of a parallel ray beam incident on the hemispherical shell.

18. The objective lens according to claim 16, wherein said sphere is composed of one of arsenic triselenide glass, telluride glass, CdTe and $As_{35}S_{10}Se_{35}Te_{20}$.

* * * * *